United States Patent [19]

Leger

[11] Patent Number: 5,745,511
[45] Date of Patent: *Apr. 28, 1998

[54] PHASE GRATING AND MODE-SELECTING MIRROR FOR A LASER

[75] Inventor: James R. Leger, Plymouth, Minn.

[73] Assignee: Regents of the University of Minnesota, Minneapolis, Minn.

[*] Notice: The term of this patent shall not extend beyond the expiration date of Pat. No. 5,454,004.

[21] Appl. No.: 682,918

[22] Filed: Jul. 16, 1996

Related U.S. Application Data

[60] Continuation of Ser. No. 434,788, May 4, 1995, which is a division of Ser. No. 239,028, May 6, 1994, Pat. No. 5,454,004.

[51] Int. Cl.[6] .................................................. H01S 3/098
[52] U.S. Cl. .................... 372/19; 372/99; 372/102; 372/108; 372/98
[58] Field of Search ............................ 372/92, 99, 108, 372/98, 102, 19

[56] References Cited

U.S. PATENT DOCUMENTS 5,627,847  5/1997  Leger ........................................ 372/102

*Primary Examiner*—Leon Scott, Jr.
*Attorney, Agent, or Firm*—Schwegman, Lundberg, Woessner, & Kluth, P.A.

[57] ABSTRACT

Method for making a custom phase-conjugating diffractive mirror for a laser resonator comprising the steps of: (a) choosing a specified beam mode profile $a_1(x,y)$ that will suit need of said designer, (b) calculating the mode profile $b(x',y')$ which is a value of the specified beam $a_1(x,y)$ that is propagated to the reflection surface of the diffractive mirror and (c) calculating mirror reflectance $t(x',y')$ which reflects phase conjugate of $b(x',y')$. A method for fabricating such a mirror is shown. Another aspect of the invention is the addition of a phase adjusting element into a laser resonator, and compensating for the addition of a phase adjusting element in the design of other phase-adjusting elements such as the mirrors.

40 Claims, 10 Drawing Sheets

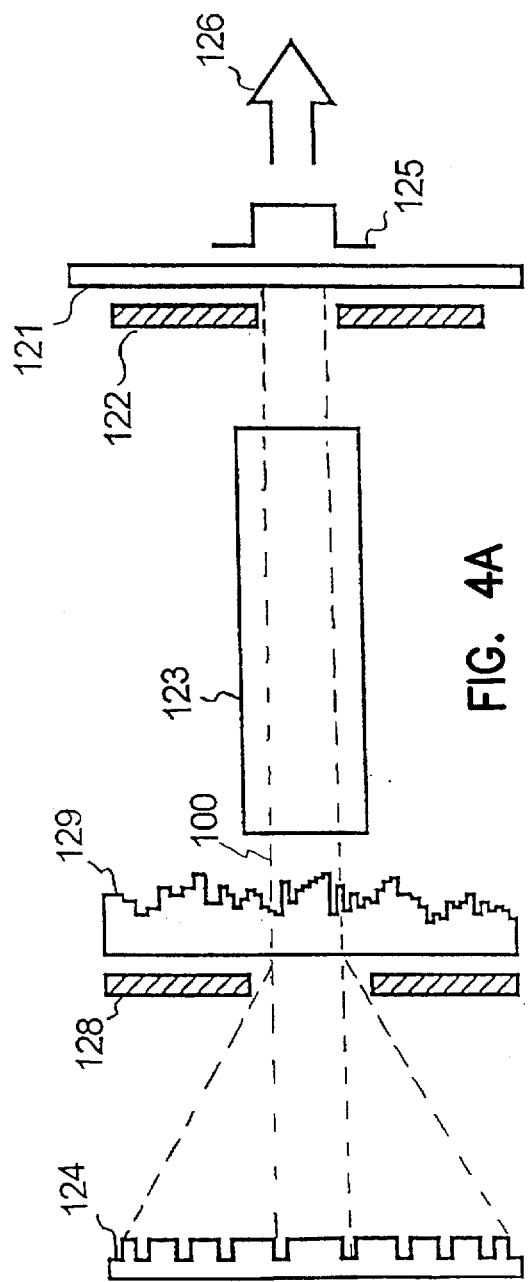
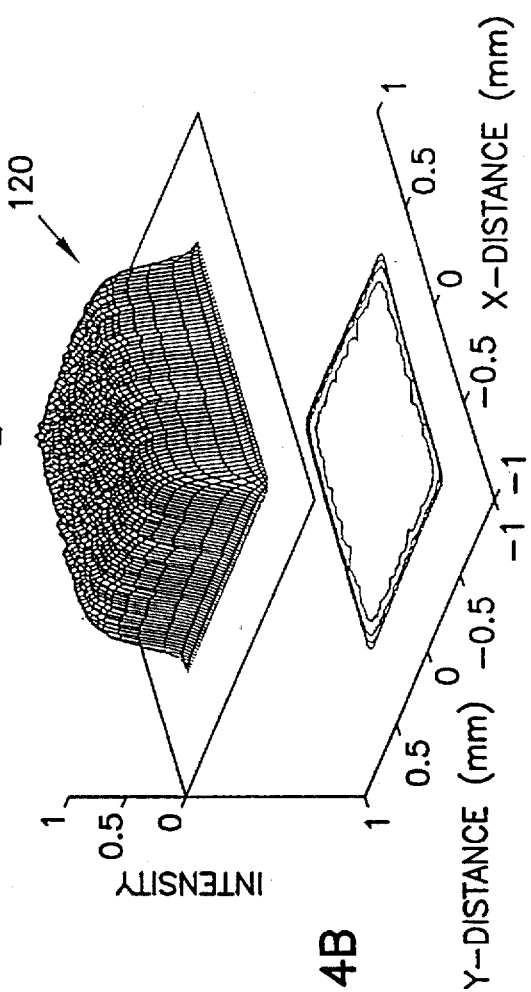
FIG. 4A
FIG. 4B

FGI. 11C

PHASE GRATING AND MODE-SELECTING MIRROR FOR A LASER

This is a continuation of Ser. No. 08/434,788 filed May 4, 1995 entitled PHASE-CONJUGATING DIFFRACTIVE ELEMENTS AND METHOD which is a divisional application of Ser. No. 08/239,028 filed May 6, 1994, now U.S. Pat. No. 5,454,004 entitled PHASE GRATING AND MODE-SELECTING MIRROR FOR A LASER.

GOVERNMENT RIGHTS

The invention was made with U.S.Government support under Grant No. NSF/ECS-9109029-01 awarded by the National Science Foundation. The U.S. Government has certain rights in the invention

FIELD OF THE INVENTION

The present invention relates to lasers and more specifically to laser components and to methods for designing and making laser components.

BACKGROUND OF THE INVENTION

Conventional laser cavity design techniques contemplate a resonator cavity, shown in FIG. 1, comprising two reflecting elements 110 and 112, surrounding a gain medium 111. The gain medium can be a plasma, a gas, a liquid, or a solid (e.g., a crystal or a semiconductor). The gain medium is excited by a power source.

The term "laser" as used in this discussion is meant to be inclusive of stimulated emission oscillators of electromagnetic radiation of any frequency from radio-frequency (RF) to beyond x-ray frequencies. (RF lasers are sometimes called "masers" by others.) The laser beam will have one or more "modes". A mode in this discussion refers to a "spatial mode", also called a "spatial eigenmode". The mode, a characteristic of the laser beam, is created within a laser cavity and has both a power-distribution profile and a phase-distribution profile. These mode profiles are generally expressed in dimensions transverse to the direction of propagation of the laser beam. A spatial mode is to be distinguished from a "temporal mode", which describes the frequency characteristics of the laser beam. A "fundamental mode" is the spatial mode which has the least loss. Amplitude profile 114 of FIG. 1 illustrates a Gaussian fundamental mode versus transverse beam radius ρ. Amplitude profile 115 of FIG. 1 also illustrates a Gaussian fundamental mode along with a second-order mode shown by curves 116 and 117.

The term "complex" as used in this discussion is mean numbers or functions having real and/or imaginary components.

The term "modal discrimination" describes a function of a laser resonator which can simultaneously provide a small fundamental-mode loss while providing large losses for higher-order modes. The modal discriminate is influenced by the chosen fundamental-mode shape, the length of the cavity, and the placement of aperture stops.

Recently, mode-selecting phase-conjugating mirrors have been used to establish tailored profiles for fundamental modes in $CO_2$ lasers [Bélanger 91].

U.S. Pat. No. 5,255,283 by Bélanger teaches a circular mode-selecting phase-conjugating mirror used to establish a radially-tailored circularly-symmetric profile for a fundamental mode in a laser resonator.

The above prior art does not appear to teach how to design or fabricate a custom phase-conjugation mirror (CPCM) which will accommodate a fundamental-mode beam profile of arbitrary profile in Cartesian x and y transverse dimensions.

SUMMARY OF THE INVENTION

The invention teaches how to design and fabricate a custom phase-conjugation mirror (CPCM) which will accommodate a fundamental-mode beam profile of arbitrary profile in Cartesian x and y transverse dimensions. The invention also teaches how to design and fabricate a diffractive mirror for use as a custom phase-conjugation mirror, which is a mirror that will reflect a wavefront having arbitrary (i.e., a complex mode profile that is not necessarily only real but may have imaginary components) field at the mirror surface. The invention also teaches using an additional phase element in a laser resonator system having a custom phase-conjugation mirror in order to enhance the phase differential between the fundamental mode and higher-order mode wavefronts over and above the result possible with a single CPCM alone. The invention also teaches using a dynamic phase element in a laser resonator system having a custom phase-conjugation mirror in order to (a) compensate for dynamic phase changes in elements in a laser resonator system or (b) introduce temporal variations in the output beam profile or power.

BRIEF DESCRIPTION OF THE DRAWINGS

FIG. 4 is a schematic diagram illustrating an embodiment of a custom phase-conjugated diffractive mirror laser resonator with a random phase-adjustment element.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood than other embodiments may be utilized and structural changes may be made without departing from the scope of the present invention.

Figure 1A:
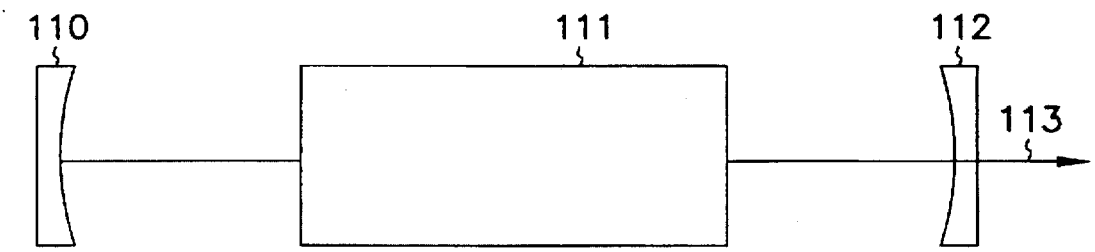
FIG. 1 is a schematic diagram illustrating a prior art laser resonator.
Figure 1B:
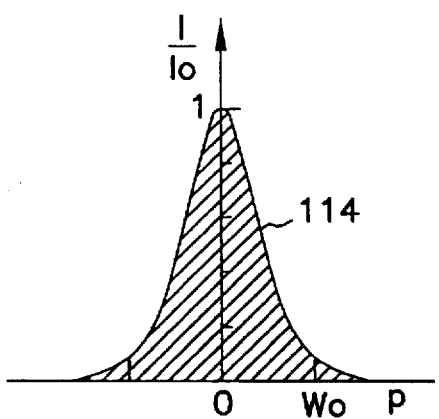
Figure 1C:
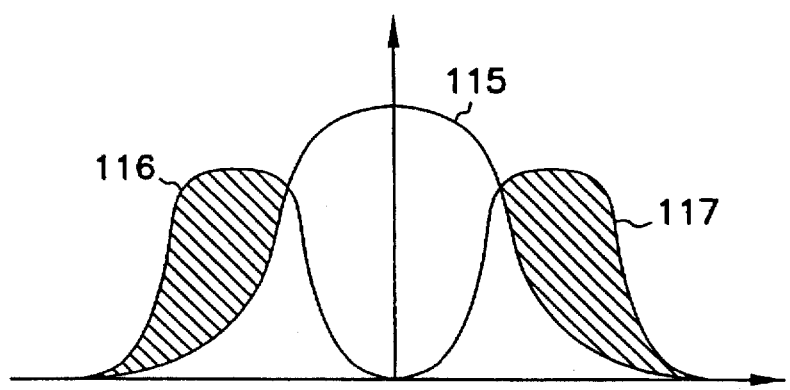
Figure 2A:
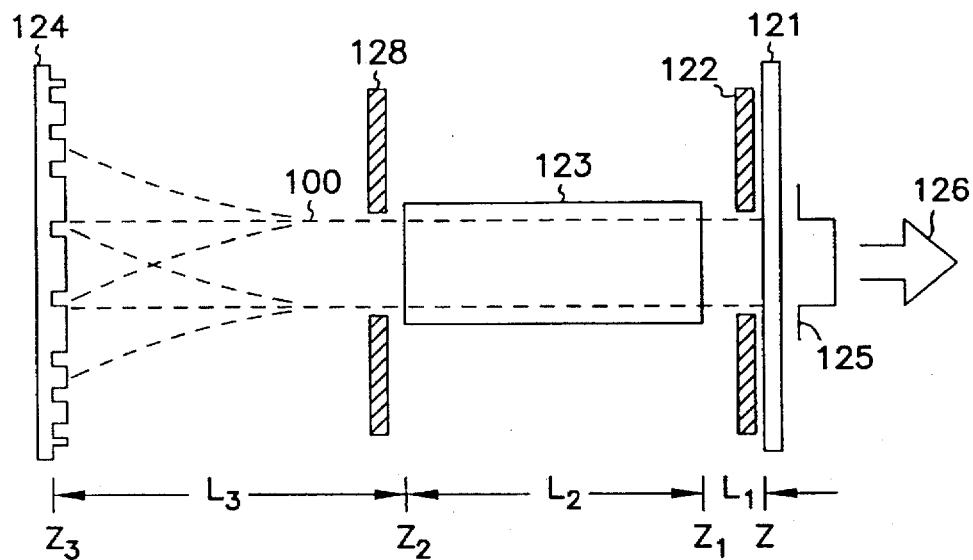
FIG. 2 is a schematic diagram illustrating an embodiment of a custom phase-conjugated diffractive mirror laser resonator.
Figure 2B:
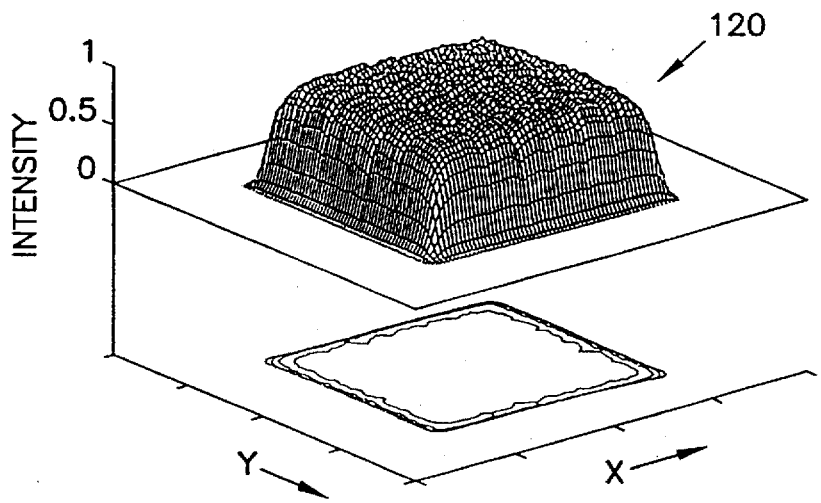

FIG. 2 is a schematic diagram illustrating an embodiment of a custom phase-conjugated diffractive mirror laser resonator. Laser beam 100 oscillates in the cavity formed by output mirror 121, laser gain medium 123, and custom phase-conjugated diffractive mirror 124. Aperture plate 122 and aperture plate 128 help to block higher-order modes. In one embodiment, aperture plate 122 and aperture plate 128 are opaque and have a non-reflective surface. Output laser beam 126 is the laser resonator output. A designer specifies the phase profile and intensity profile for the fundamental mode 125 of laser beam 100 at a point z along the propagation path of laser beam 100. In this embodiment, point z is chosen to be at the reflecting surface of output mirror 121, and thus the phase profile for the fundamental mode 125 is specified to be a wave with phase profile having values of only 0 and $\pi$ radians, corresponding to a flat surface-reflecting mirror for output mirror 121. The intensity profile for the fundamental mode 125 may be specified by the designer to be any arbitrary real positive function (a real function has no imaginary components); e.g., the intensity profile could have an approximately Cartesian square cross section approximated by graph 120 of FIG. 2 and described by the super-Gaussian equation:

$$a(x,y) = \exp[-(x/\omega_0)^{20}]\exp[-(y/\omega_0)^{20}]$$

where $\omega_0$ is the transverse beam half-width dimension at the point where intensity drops to $1/e^{40}$ of the maximum intensity along the x or y axis, and exp[ ] is the exponential function. Embodiments using smaller values (than the 20 power inside the exp[ ] function used in this case) for the exponential power may provide less-sharp edges. Even where such sharp edges are specified, boundary conditions in the laser gain medium and elsewhere in the laser resonator cavity may prevent the fundamental mode from attaining this mode profile.

A laser beam with a intensity profile having an approximately Cartesian square cross section has many uses in industry and research. Uses include integrated circuit photolithography, applications desiring reduced laser hole burning, laser doppler velocimetry, laser radar, optical memories, optical information processing and computing, laser bar-code scanning, projection TV, applications desiring patterns of squares, and laser xerographic printing and facsimile.

While this example uses a constant phase profile at point z, the equation for a(x,y) can incorporate any complex-function electric-field profile (one having both real and imagine components) as well. The discussion of FIG. 5 below discusses one such embodiment.

The designer then determines the design for the appropriate custom phase-conjugated diffractive mirror by calculating a wavefront of laser beam 100 at the end of each propagation segment of the propagation path starting from point z and ending at the reflecting surface of custom phase-conjugate diffractive mirror 124.

The wavefront of laser beam 100 at point $z_i$, the start of the path though each propagation segment i (where i may take the values 1, 2, 3, . . . n), is characterized by the equation:

$$a_i(x,y) = \int_{-\infty}^{\infty} \int_{-\infty}^{\infty} A_i(u,v)\exp[j2\pi(xu + vy)] du\, dv$$

where j is the square root of −1, u and v are spatial frequencies, x is a Cartesian distance in a direction transverse to the direction of propagation, y is a Cartesian distance in a direction transverse to the direction of propagation and orthogonal to x, and $A_i(u,v)$ is the angular wave spectrum of $a_i(x,y)$ at point $z_i$.

The wavefront of laser beam 100 at point $z_{i+1}$, the end of each propagation segment i, is then calculated using the equation:

$$a_{i+1}(x',y') = \int_{-\infty}^{\infty} \int_{-\infty}^{\infty} A_i(u,v)\exp[j2\pi(xu + vy)] \times$$

$$\exp[j(2\pi L_i/\lambda_i)(\text{sqrt}(1 - (\lambda_i u)^2 - (\lambda_i v)^2))] du\, dv$$

where exp[ ] is the exponential function, $\lambda_i$ is the effective wavelength of laser beam 100 within propagation segment i (i.e., $\lambda_i = \lambda_0/n_i$, where $\lambda_0$ is the free space wavelength of laser beam 100 and $n_i$ is the index of refraction of propagation segment i), j is the square root of −1, $L_i$ is length of propagation segment i along the path of propagation, u and v are spatial frequencies, du and dv are integration variables for u and v respectively, sqrt( ) is the square root function, x is a Cartesian distance in a direction transverse to the direction of propagation, y is a Cartesian distance in a direction transverse to the direction of propagation and orthogonal to x, and $A_i(u,v)$ is the angular wave spectrum of $a_i(x,y)$ at point $z_i$.

This step is recursively applied to each propagation segment starting, at point z specified by the designer and ending, at the surface of custom phase-conjugated diffractive mirror 124. A mode profile b(x',y') at the reflecting surface of custom phase-conjugated diffractive mirror 124 is defined as the final mode profile $a_{i+1}(x',y')$ for the last propagation segment (ending at the reflecting surface of custom phase-conjugated diffractive mirror 124). A mirror reflectance t(x',y') is then calculated which reflects the complex phase conjugate b*(x',y') of said mode profile b(x',y') at said mirror reflecting surface, using the equation:

$$t(x',y') = b*(x',y')/b(x',y')$$

where b*(x',y') is the complex (having real and imaginary components) phase conjugate of incident mode profile b(x', y').

To illustrate the above-described method, note that FIG. 2 shows three propagation segments. (i takes the values 1, 2, and 3.) The first propagation segment starts at point z, is represented by length $L_1$, has an index of refraction $n_1$ (not shown), and ends at point $z_1$ along the propagation path. The second propagation segment (through laser gain medium 123) starts at point $z_1$, is represented by length $L_2$, has an index of refraction $n_2$ (not shown) equal to the index of refraction of the gain medium, and ends at point $z_2$ along the propagation path. The third propagation segment starts at point $z_2$, is represented by length $L_3$, has an index of refraction $n_3$ (not shown), and ends at point $z_3$ at the reflecting surface of custom phase-conjugated diffractive mirror 124. The above-described method is used to calculate the mode profile $a_1(x',y')$ at point $z_1$; then, using that mode profile as the starting point, the above-described method is used to calculate the mode profile $a_2(x',y')$ at point $z_2$; then, using that mode profile as the starting point, the above-described method is used to calculate the mode profile $a_3(x',y')$ at point $z_3$ which is at the reflecting surface of custom phase-conjugated diffractive mirror 124. Mode profile $b(x',y')$ is defined as the final mode profile $a_3(x',y')$ for the last propagation segment (ending at the reflecting surface of custom phase-conjugated diffractive mirror 124). A mirror reflectance $t(x',y')$ is then calculated which reflects the complex phase conjugate $b^*(x',y')$ of said mode profile $b(x',y')$ at said mirror reflecting surface, using the equation:

$$t(x',y')=b^*(x',y')/b(x',y')$$

where $b^*(x',y')$ is the complex (having real and imaginary components) phase conjugate of incident mode profile $b(x',y')$.

Those skilled in the art would readily understand that lenses and other non-planar optical elements inside the cavity can be incorporated in the calculation by using the appropriate transmittance functions.

The surface elevation of custom phase-conjugated diffractive mirror 124 is then fabricated by known methods (see, e.g., [Leger:88]) to provide mirror reflectance $t(x',y')$. One embodiment coats the surface of custom phase-conjugated diffractive mirror 124 with a reflective coating made from a suitable dielectric material using materials and methods known to the art. Another embodiment coats the surface of custom phase-conjugated diffractive mirror 124 with a reflective coating made from a suitable metallic material using materials and methods known to the art.

In one embodiment, custom phase-conjugated diffractive mirror 124 is fabricated using a series of photolithographic masks, much in the same way as modern integrated circuits are. In other embodiments, custom phase-conjugated diffractive mirror 124 are made from any suitable material (e.g., plastic, resin, or photoresist) such as is used to to mass produce compact disks, and arrays of custom phase-conjugated diffraction mirrors can be simultaneously pressed from a single, multiple-image master negative of the desired mirror surface, much in the same way as modern audio compact-disks (CDs) or compact-disk-read-only-memories (CDROMs) are. These custom phase-conjugated diffraction mirrors can thus be mass-produced accurately and inexpensively.

In one embodiment, length $L_1$, is made as small as possible and is assumed negligible, length $L_2$ is made 7.6 cm, and length $L_3$ is made 102.4 cm. $L_3$ is made long enough that the cavity length achieves sufficient modal discrimination; this modal discrimination seems to increase until L reaches a length of one Rayleigh range $z_0$. Optimization studies on super-Gaussian mode shapes have shown [Leger 94] that the modal discrimination is maximized when the cavity length is approximately one Rayleigh range of the super-Gaussian. The "Rayleigh range", $z_0$, for a Gaussian distribution is defined by the equation $z_0 = \pi \omega_0^2/\lambda$, where $\omega_0$ is the transverse beam half-width dimension at the point where intensity drops to $1/e^2$ of the maximum intensity (e is the exponential function), and $\lambda$ is the wavelength of the lasing light wave. For this discussion, the Rayleigh range for a beam with super-Gaussian power-profile characteristics is defined using this same formula. For large fundamental-mode beam cross-sections, ($\omega_0 > 0.6$ mm), adequate modal discrimination can require excessively long cavities (greater than one meter, where $\lambda=1.06$ μm).

The reflected laser beam 100, starting at the reflecting surface of custom phase-conjugated diffractive mirror 124 with mode profile $b^*(x',y')$, then propagates in the reverse direction along the propagation path to point z. At point z, laser beam 100 will then have a mode profile $a^*(x,y)$, which is the phase conjugate of the mode profile $a(x,y)$ and traveling in the opposite direction. In this embodiment, $a(x,y)$ is specified as a wave having phase of 0 or $\pi$ radians at flat mirror 121, and thus flat mirror 121 will reflect the phase conjugate of $a^*(x,y)$, which is $a(x,y)$. This then reinforces the original specified mode profile $a(x,y)$ and establishes mode profile $a(x,y)$ as a mode of the cavity. All other modes suffer increased loss from apertures 122 and 128 in conjunction with the operation of custom phase-conjugated diffractive mirror 124, and thus $a(x,y)$ becomes the fundamental mode of the cavity.

Figure 3A:
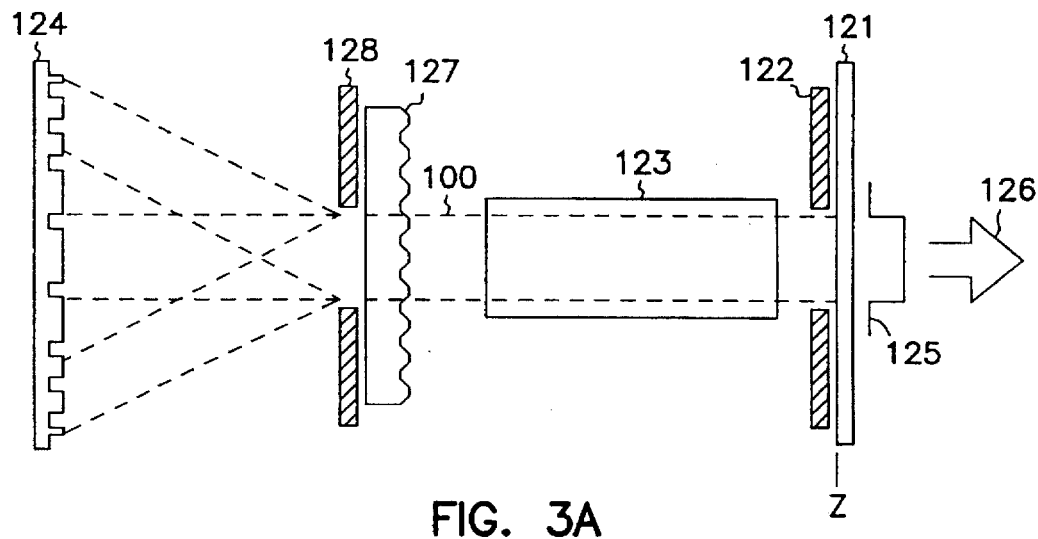
FIG. 3 is a schematic diagram illustrating an embodiment of a custom phase-conjugated diffractive mirror laser resonator with a phase-adjustment element.
Figure 3B:
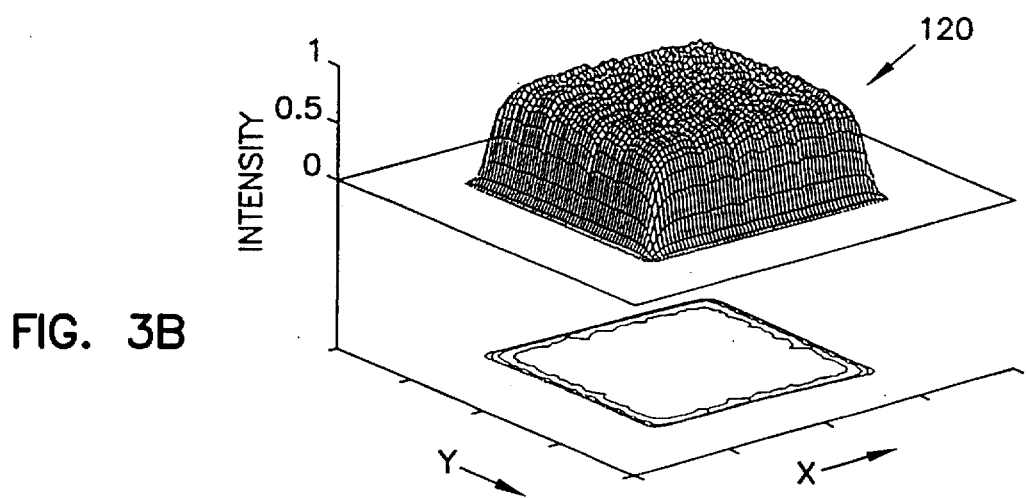

FIG. 3 is a schematic diagram illustrating an embodiment of a custom phase-conjugated mirror laser resonator similar in many respects to FIG. 2, but with a custom phase-adjustment element 127. One purpose of custom phase-adjustment element 127 is to enhance the modal discrimination of the laser resonator system. Another purpose of custom phase-adjustment element 127 is to introduce varying amounts of phase shift into various portions of the transverse cross section of laser beam 100. In this embodiment, custom phase-conjugated mirror 124 may, but need not, be a diffractive mirror.

To design the components of the custom phase-conjugated mirror laser resonator comprising a custom phase-adjustment element, the designer chooses a phase pattern for custom phase-adjustment element 127 to suit the designer's needs.

In one embodiment, illustrated in FIG. 3, custom phase-adjustment element 127 is transparent and is designed to enhance the modal discrimination of the laser resonator system by introducing a phase shift which varies sinusoidally in both Cartesian directions, x and y. In one embodiment with a phase plate having an orthogonal Cartesian sinusoidal grating pattern with a frequency of $f_x=3.8$ mm$^{-1}$ in the x-direction and $f_y=3.8$ mm$^{-1}$ in the y-direction (the phase-adjustment element has a transmittance $t(x,y)$ that approximates $e^{j \cos(2\pi(f_x x + f_y y))}$) and a laser beam wave length of 1.06 μm, the diffractive loss for the second-order mode is increased to 72.9%.

In one embodiment, calculations of the modal discrimination which would be obtained by a number of different sinusoidal phase patterns for custom phase-adjustment element 127 are performed. The sinusoidal phase pattern generating the largest calculated modal discrimination is then used to fabricate custom phase-adjustment element 127.

The method described above for FIG. 2 is recursively applied to each propagation segment starting at point z specified by the designer and ending at custom phase-adjustment element 127. The mode profile $a_{i+1}(x',y')$ at custom phase-adjustment element 127 is then adjusted for the phase shift introduced by custom phase-adjustment element 127. The method described above for FIG. 2 is then recursively applied to each propagation segment starting at custom phase-adjustment element 127 and ending at the surface of custom phase-conjugated mirror 124.

Any custom phase-conjugated mirror can be used for custom phase-conjugated mirror 124, as long as it reflects the complex phase conjugate $b^*(x',y')$ of the mode profile $b(x',y')$ defined at the reflecting surface of the mirror. Thus other laser resonator cavities known to the art could benefit from the addition of a custom phase-adjustment element 127. In this embodiment, a diffractive mirror is used for custom phase-conjugated mirror 124. As described above for FIG. 2, a mode profile $b(x',y')$ at the reflecting surface of custom phase-conjugated diffractive mirror 124 is defined as the final mode profile $a_{i+1}(x',y')$ for the last propagation segment (ending at the reflecting surface of custom phase-conjugated diffractive mirror 124); however, in this case, this b(x',y') also accounts for the phase shift introduced by custom phase-adjustment element 127. A mirror reflectance t(x',y') is then calculated which reflects the complex phase conjugate b*(x',y') of said mode profile b(x',y') at said mirror reflecting surface, using the equation:

$$t(x',y')=b^*(x',y')/b(x',y')$$

where b*(x',y') is the complex (having real and imaginary components) phase conjugate of incident mode profile b(x', y').

In one embodiment, the surface elevation of custom phase-adjustment element 127 is fabricated by known methods (see, e.g., [Leger88:]) to provide the desired phase adjustments at that element. The surface elevation of custom phase-conjugated diffractive mirror 124 is also fabricated by known methods (see, e.g., [Leger:88]) to provide mirror reflectance t(x',y'). One embodiment then coats the surface of custom phase-conjugated diffractive mirror 124 with a reflective coating made from a suitable dielectric material using materials and methods known to the art. Another embodiment coats the surface of custom phase-conjugated diffractive mirror 124 with a reflective coating made from a suitable metallic material using materials and methods known to the art.

In one embodiment, custom phase-adjustment element 127 is fabricated using a series of photolithographic masks, much in the same way as modern integrated circuits are. In other embodiments, custom phase-adjustment element 127 are made from any suitable material (e.g., plastic, resin, or photoresist) such as is used to to mass produce compact disks, and arrays of custom phase-adjustment elements can be simultaneously pressed from a single, multiple-image master negative of the desired mirror surface, much in the same way as modern audio compact-disks (CDs) or compact-disk-read-only-memories (CDROMs) are. These custom phase-adjustment elements can thus be mass-produced accurately and inexpensively.

In another embodiment, illustrated in FIG. 4, custom phase-adjustment element 129 is transparent and is designed to enhance the modal discrimination of the laser resonator system by introducing a phase shift which varies in a pseudo-random but known manner in both Cartesian directions, x and y. Other aspects of FIG. 4, and the method used to design components for the embodiment illustrated in FIG. 4, are the same as for FIG. 3. In this embodiment, custom phase-conjugated diffractive mirror 124 compensates for the known and pseudo-random phase shifts introduced to the various portions of the cross section of the mode profile by custom phase-adjustment element 129.

An arbitrary number of custom phase-adjustment elements similar in design to custom phase-adjustment element 129 may be added to an embodiment of a laser resonator cavity, with the appropriate adjustment to the affected custom phase-conjugated diffractive mirrors.

In one embodiment, a custom phase-adjustment element is designed to dynamically adjust phase. In a particular embodiment, a liquid crystal pixel array (without polarizing elements) is used to implement a custom phase-adjustment element 129. The electric field applied to each pixel adjusts the phase of that pixel. One use for such an element is to adjust for heat-induced phase changes in the gain medium.

In one embodiment, calculations of the modal discrimination which would be obtained by a number of different random phase patterns for custom phase-adjustment element 129 are performed. In one embodiment, the phase patterns are generated using different "seeds" in a random number generator. The random pattern generating the largest calculated modal discrimination is then used to fabricate custom phase-adjustment element 129.

Figure 5A:
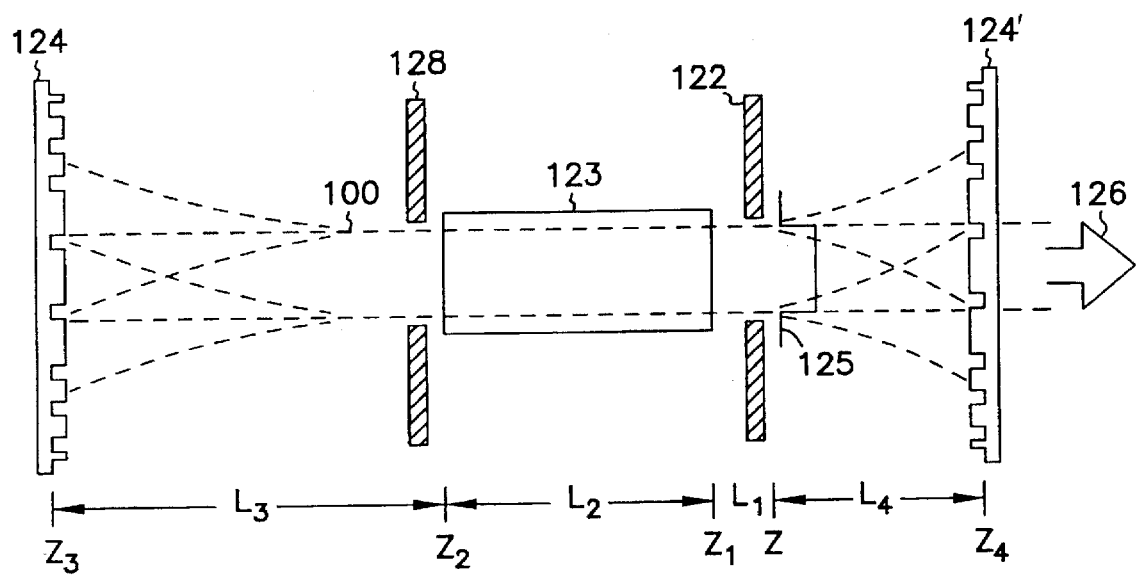
FIG. 5 is a schematic diagram illustrating an embodiment of a custom phase-conjugated diffractive mirror laser resonator with two custom phase-conjugated diffractive mirrors.
Figure 5B:
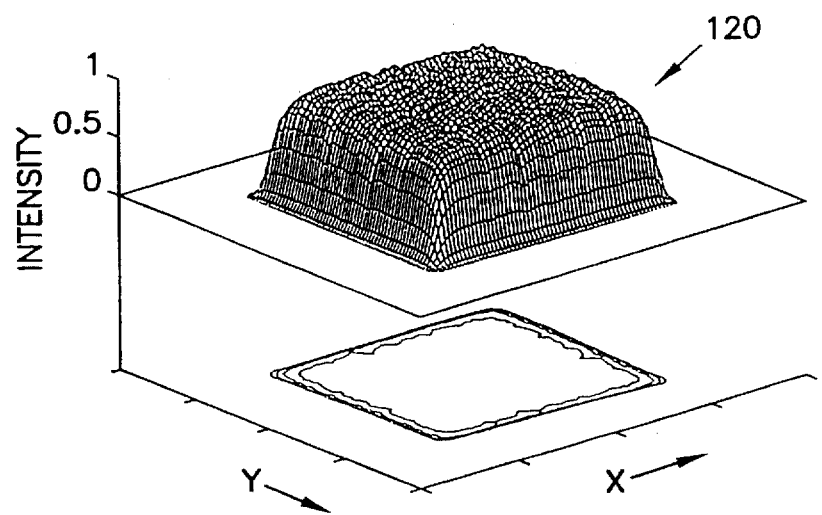

FIG. 5 is a schematic diagram illustrating an embodiment of a custom phase-conjugated diffractive mirror laser resonator with two custom phase-conjugated diffractive mirrors 124 and 124'. One embodiment of this configuration is conceptually similar to an embodiment shown in FIG. 3, with the modification that flat output mirror 121 is combined with custom phase-adjustment element 127 to form custom phase-conjugated diffractive mirror 124'.

The design of one embodiment of this configuration begins in the same manner as for FIG. 2. The method described for FIG. 2 is recursively applied to each propagation segment starting at point z specified by the designer and ending at the surface of custom phase-conjugated diffractive mirror 124. A mode profile b(x',y') at the reflecting surface of custom phase-conjugated diffractive mirror 124 is defined as the final mode profile $a_{i+1}(x',y')$ for the last propagation segment (ending at the reflecting surface of custom phase-conjugated diffractive mirror 124). A mirror reflectance t(x',y') is then calculated which reflects the complex phase conjugate b*(x',y') of said mode profile b(x',y') at said mirror reflecting surface, using the equation:

$$t(x',y')=b^*(x',y')/b(x',y')$$

where b*(x',y') is the complex (having real and imaginary components) phase conjugate of incident mode profile b(x', y').

The method described for FIG. 2 is then recursively applied to each propagation segment starting at point z specified by the designer and ending at the surface of custom phase-conjugated diffractive mirror 124'. A mode profile c(x',y') at the reflecting surface of custom phase-conjugated diffractive mirror 124' is defined as the final mode profile $a_{i+1}(x',y')$ for the last propagation segment (ending at the reflecting surface of custom phase conjugated diffractive mirror 124'). A mirror reflectance t'(x',y') is then calculated which reflects the complex phase conjugate c*(x',y') of said mode profile c(x',y') at said mirror reflecting surface, using the equation:

$$t'(x',y')=c^*(x',y')/c(x',y')$$

where c*(x',y') is the complex (having real and imaginary components) phase conjugate of incident mode profile c(x', y').

The surface elevation of custom phase-conjugated diffractive mirror 124 is fabricated by known methods (see, e.g., [Leger:88]) to provide mirror reflectance t(x',y'). One embodiment then coats the surface of custom phase-conjugated diffractive mirror 124 with a reflective coating made from a suitable dielectric material using materials and methods known to the art. Another embodiment coats the surface of custom phase-conjugated diffractive mirror 124 with a reflective coating made from a suitable metallic material using materials and methods known to the art.

The surface elevation of custom phase-conjugated diffractive mirror 124' is fabricated by known methods (see, e.g., [Leger:88]) to provide mirror reflectance t'(x',y'). One embodiment then coats the surface of custom phase-conjugated diffractive mirror 124' with a partially-reflective coating made from a suitable dielectric material using materials and methods known to the art. Another embodiment coats the surface of custom phase-conjugated diffractive mirror 124' with a partially-reflective coating made from a suitable metallic material using materials and methods known to the art. Custom phase-conjugated diffractive mirror 124' thus becomes the output coupler for the laser resonator.

The reflected laser beam 100, starting at the reflecting surface of custom phase-conjugated diffractive mirror 124 with mode profile b*(x',y'), then propagates in the reverse direction along the propagation path to point z. At point z, laser beam 100 will then have a mode profile a*(x,y), which is the phase conjugate of the mode profile a(x,y) and traveling in the opposite direction. In this embodiment, a*(x,y) continues to propagate until it reaches custom phase-conjugated diffractive mirror 124', where it will have mode profile c(x',y'). This will then reflect from the reflecting surface of custom phase-conjugated diffractive mirror 124' with mode profile c*(x',y'), and will then propagate in the original direction along the propagation path to point z. At point z, laser beam 100 will now have a mode profile a(x,y). This then reinforces the original specified mode profile a(x,y) and establishes mode profile a(x,y) as a mode of the cavity. All other modes suffer increased loss from apertures 122 and 128 in conjunction with the operation of custom phase-conjugated diffractive mirror 124, and thus a(x,y) becomes the fundamental mode of the cavity.

In one embodiment, calculations of the modal discrimination which would be obtained by a number of various specified phase profiles at various points z for specified mode profile a(x,y) are performed. The specified phase profile generating the largest calculated modal discrimination is then used to fabricate custom phase-conjugated diffractive mirrors 124 and 124'.

In another embodiment, a ring-laser resonator cavity comprising a custom phase-conjugated diffractive mirror 124 is built. In this embodiment, point z is specified at a location that is one-half the propagation distance around the ring from custom phase-conjugated diffractive mirror 124. The mode profiles around the ring are then calculated in a manner as described for FIG. 2, taking into account the phase change introduced at each bending node around the ring. Thus accounted for, the complex mode profile (a mode profile having both real and imaginary components) of the laser beam 100 when it completes the path around the ring will match the starting mode profile a(x,y).

The laser mode profile can be chosen to have any real positive function of power distribution and arbitrary phase distribution by proper design of the mode-selecting mirrors. In addition, the cavity can be optimized to simultaneously provide a small fundamental mode loss while providing large losses for higher-order modes (a function called "modal discrimination"). The modal discrimination is influenced by the chosen fundamental-mode shape, the length of the cavity, and the placement of aperture stops.

The cavity design of the invention preserves high modal discrimination while allowing use of a shorter cavity length. One embodiment, shown in FIG. 3, comprises a flat output mirror 121, a diffractive mode-selecting mirror 124, and a sinusoidal phase grating 127. The designer selects a desired profile for the transverse section of the fundamental mode at the output port, and calculates the Rayleigh-Sommerfeld diffraction pattern of this selected profile at the mode-selecting mirror after passing through the gain medium 123, any other internal optics, and the phase grating. The diffractive profile of the diffractive mode-selecting mirror ("DMSM") 124 is chosen to reflect the phase conjugate of this distribution. The reflected light wave will then retrace its path through the phase gating 127 and form the original selected profile at the output mirror 121 (at point z), thus reinforcing the selected profile and defining it as a mode of the cavity. Higher-order modes are partially blocked by the aperture 128 placed at the phase grating 127 and the aperture 122 placed at the output mirror 121, producing a high loss for those higher-order modes.

A Fox-and-Li analysis [Fox:61] of the above cavity with, and without, a phase grating 127 was performed and the optimum characteristics of a phase grating with a modulation depth of ±1 radian was studied. Without the gating, a mode-selecting-mirror cavity (with a cavity length of 1 meter) designed for a 20th-order super-Gaussian beam of transverse half-width $\omega_0$=0.6 mm was shown to present a maximum loss to the second-order mode of 48.6% (which is due to the design of the DMSM in conjunction with the apertures). However, when this cavity is reduced in length to 50 cm, the loss to the second-order mode is reduced to only 25.4% (a modal discrimination value which is too small for many high-gain laser designs). There is significant improvement in modal discrimination of this 50-cm-long cavity when a phase grating of spatial frequency f is inserted in the cavity along with a corresponding DMSM. For a phase plate with an orthogonal Cartesian sinusoidal grating pattern with a frequency of $f_x$=3.8 mm$^{-1}$ in the x-direction and $f_y$=3.8 mm$^{-1}$ in the y-direction (the phase-adjustment element has a transmittance t(x,y) that approximates $e^{j\cos(2\pi(f_x x + f_y y))}$), the diffractive loss for the second-order mode is increased to 72.9%. This phase-plate spatial frequency, corresponding to approximately 4.5 periods across the laser beam transverse cross section, gives the optimal modal discrimination. The maximum modal discrimination occurs when the grating has a phase shift corresponding to a sine function. In all of these examples, the 20th-order super-Gaussian fundamental mode (with square Cartesian beam transverse cross section) is preserved and suffers negligible loss in the cavity.

Figure 6:
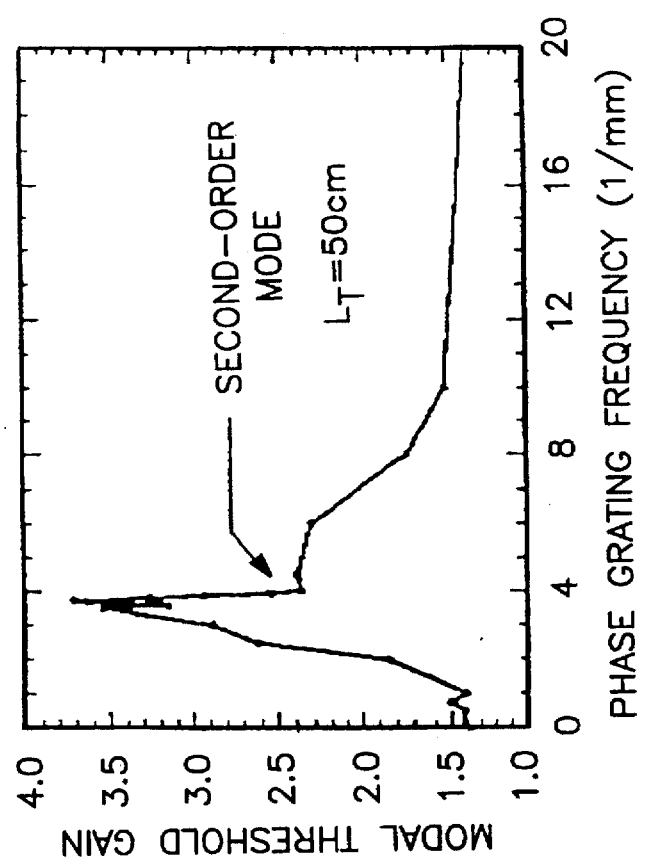
FIG. 6 is a graph of calculated modal threshold gain versus the grating frequency for a sinusoidal Cartesian pattern for a phase-adjustment element.

FIG. 6 is a graph of calculated modal threshold gain versus the grating frequency for a sinusoidal Cartesian pattern for a phase-adjustment element.

Figure 7B:
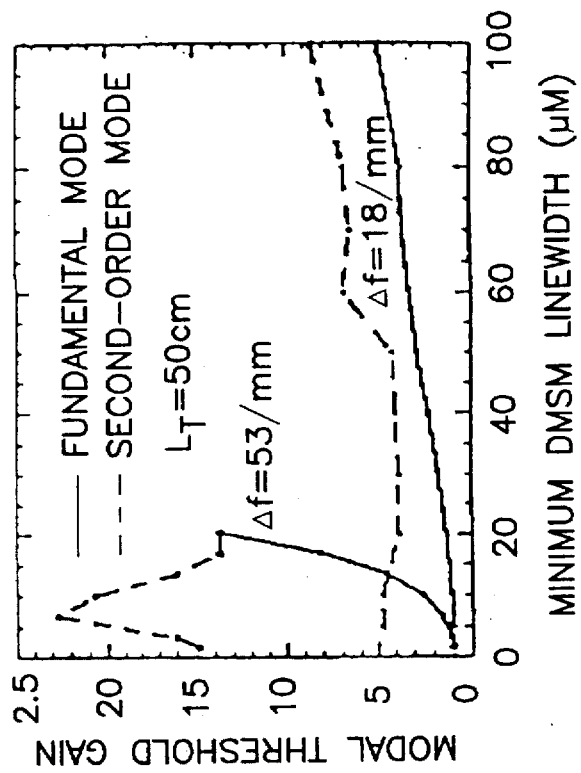
FIG. 7b is a graph of calculated modal threshold gain versus the minimum line- width a random Cartesian pattern for a phase-adjustment element.
Figure 7A:
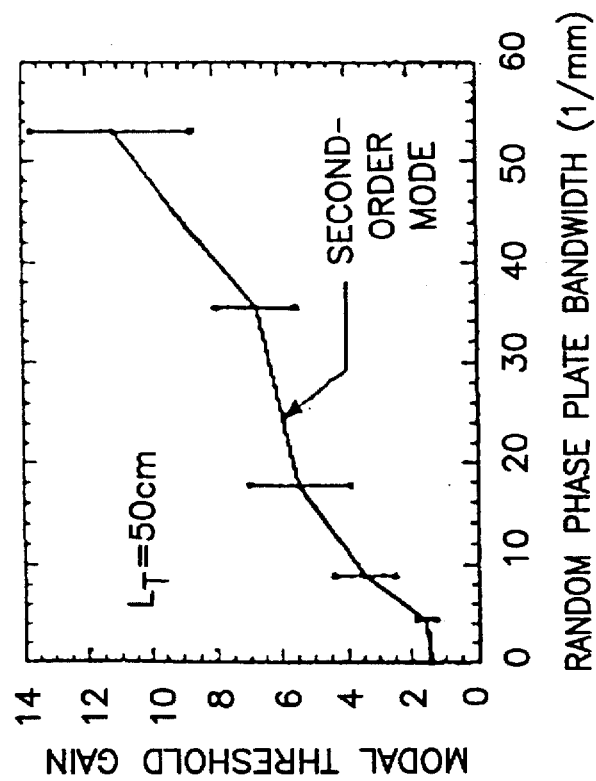
FIG. 7a is a graph of calculated modal threshold gain versus the grating frequency bandwidth for a random Cartesian pattern for a phase-adjustment element.

FIG. 7a) is a graph of calculated modal threshold gain versus the grating frequency bandwidth for a random Cartesian pattern for a phase-adjustment element.

FIG. 7b) is a graph of calculated modal threshold gain verses the minimum DMSM line- width a random Cartesian pattern for a phase-adjustment element.

Figure 8:
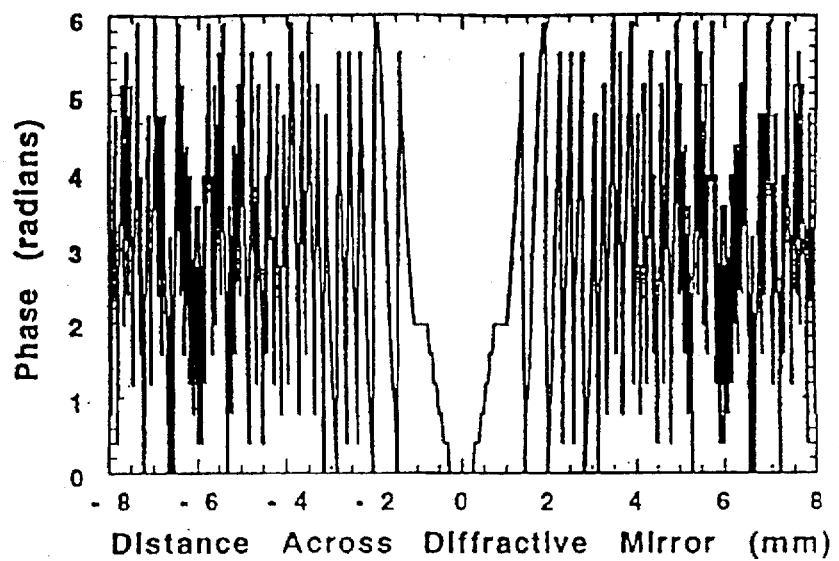
FIG. 8 is a graph of a cross section of the phase shift amounts on a custom phase-conjugating diffraction mirror.

FIG. 8 is a graph of a cross section of the phase shift amounts on a custom phase-conjugating diffraction mirror.

Figure 9:
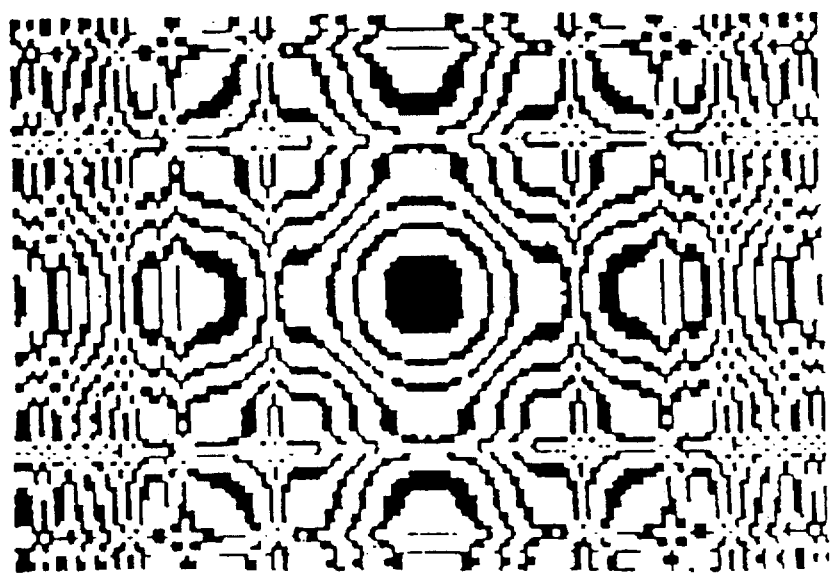
FIG. 9 is a schematic of a plan of the phase shift amounts on one mask for fabricating a custom phase-conjugating diffraction mirror.
Figure 10A:
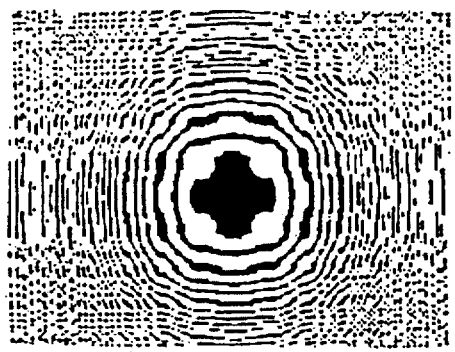
FIG. 10 is a schematic of a plan of the phase shift amounts on four masks for fabricating a custom phase-conjugating diffraction mirror.
Figure 10B:
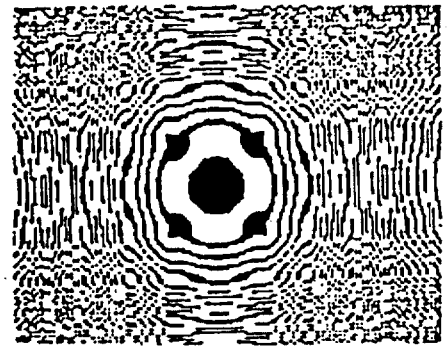
Figure 10C:
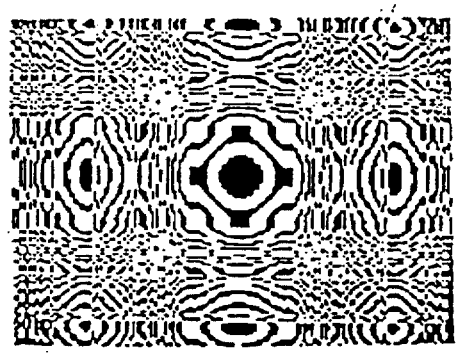
Figure 10D:
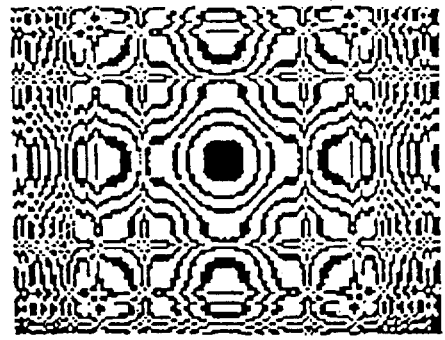
Figure 11A:
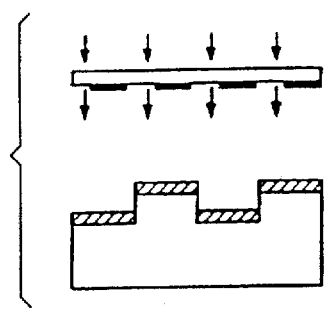
FIG. 11 is a schematic of a section showing the process for fabricating a custom phase-conjugating diffraction mirror.
Figure 11B:
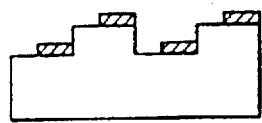
Figure 11D:
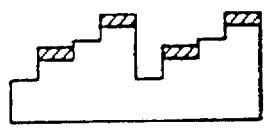
Figure 11D:

FIG. 9 is a schematic of a plan of the phase shift amounts on one mask for fabricating a custom phase-conjugating diffraction mirror.

FIG. 10 is a schematic of a plan of the phase shift amounts on four masks for fabricating a custom phase-conjugating diffraction mirror.

FIG. 11 is a schematic of a section showing the process for fabricating a custom phase-conjugating diffraction mirror.

Some applications, such as short-pulse Q-switching, require a large mode cross-section and short cavity length. The same cavity design was studied with a total length of 10 cm (corresponding to 1/10 Rayleigh range). Using a phase plate having a grating with a spatial frequency of 10.5 mm$^{-1}$, the cavity loss for the second-order mode is 58.3%. This large modal discrimination is significantly greater than a simple DMSM cavity without a phase plate with a length of one full Rayleigh range (in this case, approximately 1 meter).

The addition of a phase plate in a mode-selecting-mirror laser cavity permits both a reduction in the required cavity length and an increase in modal discrimination.

Phase-Adjusting Elements

The vast majority of commercial lasers utilize a stable Fabry-Perot resonator to establish the laser mode. Although the Fabry-Perot resonator design produces a low-loss fundamental mode, it has several inherent disadvantages. First, the losses to the higher-order spatial modes are also fairly low, making it difficult to insure operation in a single spatial mode. In addition the verse dimensions of the fundamental mode laser beam are usually small, reducing the amount of power that can be extracted from the gain medium. Increasing the transverse dimensions of the fundamental-mode laser beam reduces the modal discrimination between the fundamental mode and the higher-order modes to an unacceptable level. Finally, using a Gaussian profile for the fundamental mode may not be ideal for applications that require uniform illumination Unstable resonators can support transverse dimensions of the fundamental-mode laser beam while simultaneously preserving adequate higher-order mode discrimination. However, these resonators have inherently "lossy" fundamental modes, and are not suitable for low-gain laser systems. In addition, they often have an obstructed output aperture that produces an undesirable near-field pattern (the power-distribution profile as measured near the output port of the laser cavity).

Recently, a variety of laser cavities have been demonstrated that use more sophisticated optics to tailor the fundamental-mode shape and increase the modal discrimination between adjacent spatial modes. These include variable-reflectivity mirrors [Silvestri:90], circular graded phase mirrors [Bélanger:92], and diffractive mode-selecting mirrors [Leger:92, Leger91]. The last two methods allow the designer to tailor the mode profile to any desired shape (although Bélanger's beam has only circular symmetry), and have been used to generate super-Gaussian fundamental modes with exceedingly flat tops. However, large modal discrimination between spatial modes seems to occur when the cavity length is approximately one Rayleigh range of the super-Gaussian. Thus, for laser beams with larger transverse dimensions, these methods can result in very large cavity lengths, thus compromising mechanical stability and increasing the pulse length for Q-switched operation.

A variation of the diffractive mode-selecting mirror cavity is described that significantly increases the modal discrimination while reducing the required cavity length. The cavity, shown in FIG. 3, contains a diffractive mode-selecting mirror 124 on one end and a flat mirror 121 on the other end. A transparent phase plate 127 is placed between these two mirrors to (a) increase the modal discrimination, (b) increase the output power, (c) decrease the cavity length, and (d) increase the allowed diameter of the laser beam mode. The maximum feature size on the DMSM, however, must be made smaller to compensate for the higher spatial frequencies on the phase front at the mirror due to the phase plate.

The design of the cavity proceeds in much the same way as the simple diffractive mode-selecting mirror [Leger91]. The designer first chooses the desired amplitude and/or phase profile of the fundamental mode at any convenient longitudinal location, (e.g., one such location is at the flat output mirror 121, where the complex light field is everywhere real). The resulting field of the selected profile propagated through the gain medium 123 (and any other internal optics) to the phase plate is calculated by the Rayleigh-Sommerfeld diffraction formula, $$a_{i+1}(x',y') = \int_{-\infty}^{\infty} \int_{-\infty}^{\infty} A_i(u,v) \exp[j2\pi(xu+vy)] \times$$

$$\exp[j(2\pi L_i/\lambda_i)(\mathrm{sqrt}(l - (\lambda_i u)^2 - (\lambda_i v)^2))] du\, dv$$

where exp[ ] is the exponential function, $\lambda_i$ is the effective wavelength of laser beam 100 within propagation segment i (i.e., $\lambda_i = \lambda_0/n_i$, where $\lambda_0$ is the free space wavelength of laser beam 100 and $n_i$ is the index of refraction of propagation segment i), j is the square root of $-1$, $L_i$ is length of propagation segment i along the path of propagation, u and v are spatial frequencies, du and dv are integration variables for u and v respectively, sqrt( ) is the square root function, x is a Cartesian distance in a direction transverse to the direction of propagation, y is a Cartesian distance in a direction transverse to the direction of propagation and orthogonal to x, and $A_i(u,v)$ is the angular wave spectrum of $a_i(x,y)$ at point $z_i$, multiplied by the phase transmittance of the plate $e^{[j\phi(x,y)]}$, and then propagated the remaining distance to the diffractive mode-selecting mirror.

The reflectance of the diffractive mode-selecting mirror is then chosen to return the phase conjugate of this calculated distribution. The diffractive mode-selecting mirror 124 with the chosen reflectance is fabricated using known methods; see, e.g., [Leger 1988]. The phase-conjugate wave will propagate back through the phase plate 127 and gain medium 123 (and any other internal optics) to the output mirror 121, regenerating the designer-selected original distribution and establishing it as a mode of the cavity. If the size of the mode-selecting mirror 124 is made sufficiently large and the two aperture sizes $d_1$, and $d_2$ for apertures 122 and 128 are chosen properly, the loss to this mode can be made very small and it becomes the fundamental cavity mode. The higher-order cavity modes are then calculated by solving the integral equation $$\int K(\bar{x},\bar{x}')U_\nu(\bar{x}')dL2\bar{x}' = \gamma_\nu U_\nu(\bar{x})$$

where the integral kernal $K(\bar{\chi},\bar{\chi}')$ describes the round trip propagation in the cavity, $U_\nu(\bar{\chi})$ are the eigenfunctions of the equation, and $\delta_\nu$ their corresponding eigenvalues. One embodiment designs a phase plate with a phase function $$\exp[j\phi(x,y)]$$

that provides the maximum amount of loss to the second-order mode for a given cavity length.

Referring to FIG. 3, modeling experiments were performed using a laser cavity with element spacing $L_2=20$ cm and $L_3=30$ cm, resulting in a total cavity length $L_T=50$ cm. The fundamental mode was chosen to be a 20th-order super-Gaussian of square cross-section and beam transverse dimension of 1.2 mm in both the x and y dimensions. The output aperture 122 has size $d_1=1.3$ mm, resulting in negligible clipping of the super-Gaussian. The phase-plate aperture 128 has $d_2$ chosen to be 4 mm to pass the diffracted super-Gaussian beam with negligible clipping. The diffractive mode-selecting mirror 124 was assumed to be arbitrarily large.

The first phase plate 127 studied was a simple phase grating with $\phi(x,y)=m \sin(2\pi f_g x)$, where m is the modulation index and $f_g$ is the phase plate grating frequency. The loss to the fundamental mode in this case was always less than 0.1%. FIG. 6 shows the laser threshold gain $g_{th}$ required for the second-order mode to overcome the cavity diffractive loss. $g_{th}$ is related to the cavity loss l by $g_{th}=1/(1-l)$, so that a threshold gain of unity corresponds to a "lossless" cavity.

Threshold gains were calculated for a phase plate grating 127 with m=1 and a variety of frequency values $f_g$. A grating frequency $f_g=0$ corresponds to a simple diffractive mode-selecting mirror cavity, and has a threshold gain $g_{th}=1/(1-l)=1.4$ (or a loss l=28%). This value can be improved markedly by increasing the grating frequency to approximately 4 cycles/mm, where $g_{th}=1/(1-l)=3.7$ (corresponding to a loss of 73%). Increasing the frequency past this point decreases the modal discrimination. This is expected since for a sufficiently high frequency, the different orders of the grating do not overlap. The diffractive mode-selecting mirror then simply consists of copies of the simple mode-selecting mirror at each of the diffraction orders. The effects of grating translation and modulation depth were also studied. Modal threshold gains as large as $g_{th}=1/(1-1)=6.9$ were observed for phase modulation depths m=11 radians.

It was postulated that the degree of modal discrimination was related to the angular plane wave spectrum incident on the mode-selecting mirror. To test this, a series of experiments was performed using random phase plates with different angular plane wave spectra. Each phase plate was designed to have an approximately Gaussian angular plane wave spectrum with the power spectral bandwidth defined as the $1/e^2$ point of the Gaussian. FIG. 7a shows the increase of threshold gain to the second-order mode with increasing phase plate bandwidth. These results are from using a phase plate with random phases. FIG. 7a) shows laser gain required to overcome diffractive losses to the second-order mode as a function of the spatial-frequency bandwidth of the phase plate. FIG. 7b) shows the effect of finite diffractive mode-selecting mirror linewidth on the threshold gain of the fundamental and second-order modes for two different bandwidths $\Delta f$.

The error bars show the statistical variation in the simulation. Very high modal discrimination can be obtained by presenting the diffractive mode-selecting mirror with a sufficiently intricate light field. The price paid for this increased modal discrimination is an increase in intricacy of the mode-selecting mirror. FIG. 7b shows the effect of mode-selecting mirror linewidth quantization on the modal gains of the fundamental and second-order mode. For fundamental-mode losses of approximately 0.1%, features as large as 5 µm can be used for the low-bandwidth phase mask (18 mm$^{-1}$), whereas 1.7 µm features are required for a high-bandwidth phase mask (53 mm$^{-1}$).

Finally, an embodiment implemented a very short ($L_T$=10 cm) laser cavity containing a random phase plate with a bandwidth of 44 mm$^{-1}$. The phase mask was placed in the center of the cavity as in FIG. 4 ($L_2$=5 cm, $L_3$=5 cm), and a 20th-order super-Gaussian chosen as the fundamental-mode profile. A mode-selecting mirror was designed with a minimum feature size of 2 µm and 16 phase quantization levels. The resulting fundamental cavity mode profile is shown in FIG. 4 at graph 120, for a 1.2-mm beam size. Graph 120 shows the theoretical two-dimensional fundamental-mode intensity profile of a 10-cm laser cavity containing a random phase plate.

The finite linewidth and phase quantization of the mode-selecting mirror produce small non-uniformities in the beam profile and result in a fundamental-mode loss of approximately 1.3%. The gain required to overcome the losses to the second-order mode was 5.1 (corresponding to a loss of greater than 80%). For comparison, a stable Fabry-Perot cavity with the same cavity length, beam size, and fundamental mode loss has a second-order modal gain of only 1.08, corresponding to a loss of just 7.2%.

If a modal gain of 2.0 is sufficient to discriminate against the second-order mode (corresponding to a loss of 50%), beam diameters of up to 4.5 mm can be used in this 10-cm-long cavity. It is therefore possible to extract a large amount of power from the gain medium, while still maintaining a very small cavity length.

In conclusion, a new type of laser resonator was implemented that employs an intra-cavity phase plate and a diffractive mode-selecting mirror to produce large-diameter fundamental modes in a short cavity. The intensity profile of the fundamental mode can be chosen to suit the application, and the loss to higher-order modes designed to effectively insure single-spatial-mode operation.

A Laser Using Two Custom Phase-Conjugated Diffractive Mirrors

A diffractive laser cavity mirror is described in the discussion for FIG. 2 and FIG. 5 that can tailor the laser mode profile in amplitude and phase. An embodiment of this diffractive element is shown in FIG. 2 for a square, flat-top fundamental mode. The mirror had a theoretical fundamental mode loss of only 0.001 and a second-order mode loss of 0.57, resulting in high modal discrimination. The fabricated mirror was tested in a Nd:YAG laser system. The resulting square flat-top mode had an RMS flatness of 1.5% of maximum and a large discrimination against higher-order modes.

Conventional spherical mirrors are used in virtually all modern laser resonators. Although the resulting Gaussian mode shape is sometimes desirable, there are many applications where a different shape may be more appropriate. In addition, the modal discrimination of adjacent transverse modes is often small, and it is desirable to maximize this modal discrimination while maintaining a large mode volume. Amplitude spatial filtering has been used to produce flat-top laser mode profiles [Kermnene:92]. More intricate mirror shapes have been used to tailor the modal profile of diode laser arrays [Leger92, Leger91, Leger93] and $CO_2$ lasers [Bélanger91, Bélanger92, Bélanger92a]. The invention extends this latter technique using diffractive optical elements to tailor the fundamental mode of a Nd:YAG laser. In addition, careful choice of cavity length and modal filters can provide large modal discrimination.

The laser cavity shown in FIG. 5 consists of two diffractive mode-selecting mirrors spaced by a distance $L_T$, the sum of all $L_i$ for each propagation segment in the propagation path.

The design of the diffractive mirrors is chosen to establish the desired mode as the fundamental mode of the resonator system. Let the desired amplitude and phase of the mode just to the left of z be described by $a_i(x,y)$, where $a_i(x,y)$ is a complex function. This can be expressed equivalently in terms of its angular plane wave spectrum $A_i(u,v)$ as $$a_i(x,y) = \int_{-\infty}^{\infty} \int_{-\infty}^{\infty} A_i(u,v) \exp[j2\pi(xu + vy)] du\, dv$$

where j is the square root of −1, u and v are spatial frequencies, x is a Cartesian distance in a direction transverse to the direction of propagation, y is a Cartesian distance in a direction transverse to the direction of propagation and orthogonal to x, and $A_i(u,v)$ is the angular wave spectrum of $a_i(x,y)$ at point $z_i$.

The wavefront of laser beam 100 at point $z_{i+1}$, the end of a propagation segment i, is then calculated using the equation:

$$a_{i+1}(x',y') = \int_{-\infty}^{\infty} \int_{-\infty}^{\infty} A_i(u,v) \exp[j2\pi(xu+vy)] \times$$

$$\exp[j(2\pi L_i/\lambda_i)(\text{sqrt}(l - (\lambda_i u)^2 - (\lambda_i v)^2))] du\, dv$$

where exp[ ] is the exponential function, $\lambda_i$ is the effective wavelength of laser beam 100 within propagation segment i ($\lambda_i=\lambda_0/n_i$, where $\lambda_0$ is the free space wavelength of laser beam 100 and $n_i$ is the index of refraction of propagation segment i), j is the square root of −1, $L_i$ is length of propagation segment i along the path of propagation, u and v are spatial frequencies, du and dv are integration variables for u and v respectively, sqrt( ) is the square root function, x is a Cartesian distance in a direction transverse to the direction of propagation, y is a Cartesian distance in a direction transverse to the direction of propagation and orthogonal to x, and $A_i(u,v)$ is the angular wave spectrum of $a_i(x,y)$ at point $z_i$.

The distribution at the reflecting surface of mirror 124 is given by recursive application of the above equations for the propagation path. If the mirror 124 is constructed with a reflectance $t_2(x',y')$ of $$t_2(x',y') = \{b^*(x',y')\}/\{b(x',y')\},$$

where * indicates the complex conjugate, the return wave is given by $$b(x',y')t_2(x',y') = b^*(x',y') = $$

$$\int_{-\infty}^{\infty}\int_{-\infty}^{\infty} A^*(u,v)\exp[-j2\pi(xu + yu)]\exp[-jkl\sqrt{1-(\lambda u)^2-(\lambda v)^2}\,]du\,dv.$$

Propagation back to z results in $$\int_{-\infty}^{\infty}\int_{-\infty}^{\infty} A^*(u,v)\exp[-j2\pi(xu+yv)]du\,dv = c^*(x,y)$$

If now the mirror reflectance of 124' is chosen to be $$t_1(x,y) = \{c(x,y)\}/\{c^*(x,y)\},$$

the original distribution a(x,y) has reproduced itself after one round-trip in the laser cavity, thereby establishing itself as a mode of the system.

Since the reflectances of the two mode-selecting mirrors are phase-only, they can be easily fabricated as diffractive optical elements. By making these elements sufficiently large, diffractive losses can be kept to a minimum and the loss to the fundamental mode can be very small. This phase-conjugate cavity is reminiscent of resonators based on Brillouin scattering or four-wave mixing [Auyeung:79]. Note, however, that the mode-selecting mirror phases are fixed, so this low-loss imaging only occurs for the desired fundamental mode. The diffractive mirror can be designed to be "lossy" to higher-order modes, making it an effective filter for fundamental-mode operation.

Because diffractive mirrors can be fabricated for virtually any phase profile, the geometric shape of the mode as well as its amplitude and phase profile are entirely arbitrary. To demonstrate the flexibility of this technique, a square-shaped mode with approximately uniform amplitude and phase a(x,y) given by a super-Gaussian of order 20 was generated:

$$a(x,y) = \exp[-(x/\omega_0)^{20}]\exp[-(y/\omega_0)^{20}]$$

where $\omega_0$ is 0.6 mm, and is the transverse beam half-width dimension at the point where power drops to $1/e^{40}$ of the maximum power, exp[ ] is the exponential function. It is apparent that mirror 124' of FIG. 5 can be replaced by a plane mirror 121 of FIG. 2, and only a single element needs to be fabricated. The phase of mirror 124 is calculated by using the above method for the chosen cavity length [Leger91, Leger92, Bélanger92]. A diffractive optical element is then produced by performing a "modulo-$2\pi$" operation on the phase function and quantizing the result into sixteen levels. The phase profile of the diffractive element is shown in FIG. 8.

A diagram of a Nd:YAG laser cavity is shown in FIG. 2.

The laser cavity consists of a partially-reflecting flat output mirror 121, a 100% -reflecting mode-selecting mirror 124, and a flashlamp-pumped ND:YAG laser medium 123. Both mirrors have adjustable apertures 122 and 128 to control their size. A Fox-and-Li analysis [Fox:61] of the laser modes was performed to study the effect of the mirror phase quantization, laser cavity length, and mirror aperture sizes on the mode shape and mode loss. Initial designs of the mode-selecting mirror using four and eight phase-quantization levels resulted in fundamental modes with excessive ripple in the flat-top region. The theoretical mode produced by a sixteen-level element was very close to the ideal 20th-order super-Gaussian, with sharp sidewalls and an RMS ripple of less than 1.5% in the flat-top region. The minimum line width for this 16-level approximation is 50 μm, making fabrication quite straightforward. Since the smallest features at the edge of the phase function in FIG. 8 are 150 μm, this 50 μm sampling is more than adequate.

The cavity length and mode-selecting mirror size were then optimized by calculating the modal loss for the two lowest-order modes as a function of mirror separation and diffractive mirror size. (See, e.g., [Leger:94].)

For each mirror spacing, a new mode-selecting mirror was calculated to produce the same desired fundamental mode. The round-trip intensity loss of the two-dimensional mode was determined by calculating the eigenvalue of a specific one-dimensional mode $Y_v$, and using: loss=$1-Y_v^4$.

For mode-selecting mirror sizes greater than approximately 4 mm, the loss to the lowest-order mode is negligible (<0.0001). The loss to the next lowest-order mode is seen to peak at a distance $z_0$, where as above, Rayleigh range $$L_T = \pi\omega_0^2/\lambda$$

is the Rayleigh range of a conventional Gaussian beam. For the experiment that was conducted, 107 $_0$=0.6 mm, $\lambda$=1.06 μm, and $L_T$=1.07 meters. When the increased index of the YAG crystal in part of the cavity (index of refraction n=1.8 over 10 cm) is accounted for, the resultant cavity length is 1.10 meters.

From experiments [Leger:94], it is apparent that the maximum modal discrimination is achieved for small mode-selecting mirrors. However, small mirror sizes tend to produce a mode with less steep sidewalls. This is to be expected, since the higher harmonics from the square-mode diffraction are clipped by the mirror. In one embodiment, a mode-selecting mirror size of 8 mm was therefore chosen as a compromise between modal discrimination and desired mode shape.

The finite output mirror has very little effect on the shape or loss of the fundamental mode for mirror sizes greater than 1.2 mm, as expected. The loss to the second-order mode is significant and increases with a reduced output mirror size. For the 1.2-mm mirror used in the case study, the fundamental mode loss is 0.001 and the second-order mode loss is 0.57. This substantial loss difference makes it possible to pump the laser hard while still maintaining single-spatial-mode operation.

The mode-selecting mirror was fabricated by a four-step mask-and-etch process [Leger:88]. This procedure resulted in a 16-level phase element with a profile that approximated the phase. FIG. 9 shows one of the four e-beam masks fabricated to produce the element. Since the smallest features on any of the masks were only 50 μm in size, wet chemical etching was used. This gave a very controllable etch rate and produced an optically smooth surface.

The performance of the diffractive mode-selecting mirror was studied first outside the laser cavity. A highly expanded continuous-wave ("cw") Nd:YAG laser was used to illuminate a 1.2 mm by 1.2 mm square aperture with a uniform plane wave. The mode-selecting mirror was placed 1.10 meters behind this aperture, and the reflected wave studied after propagation back to the square aperture. The mirror produced a very well-defined square shape. The modal reflectivity was measured by comparing the power in this square image (integrated over a slightly larger square area of 1.3 mm by 1.3 mm) to the incident power. After compensating for the imperfect reflectivity of the gold coating, the modal reflectivity was measured to be 98% to 99%.

The performance of the mode-selecting mirror inside a laser cavity was studied next. The laser cavity was set up as in FIG. 2 with a pulsed single-tube flash lamp pumping the YAG rod. The pulse rate was kept below 2 Hz to reduce thermal effects on the laser rod; interferometric measurements of the rod by a HeNe probe beam showed these thermal aberrations to be negligible.

The shape of the mode intensity was measured by a linear CCD camera and frame grabber. It was discovered experimentally that slightly better mode shapes were produced using output apertures 122 having aperture sizes between 1.7 mm and 2.0 mm. An embodiment used an output aperture 122 of 2.0 mm, and a corresponding mode-selecting mirror aperture 128 of 16 mm. The RMS flatness across the top of the measured beam is 1.5% of the peak value.

The square shape of the mode schematically represented in graph 120 of FIG. 2 was virtually unaffected by the shape of the apertures, even when circular- and diamond-shaped apertures were used. Some degradation of the sidewall steepness was noticed when the output aperture was reduced to below 1.5 mm, but the size of the mode remained relatively unchanged. Larger output apertures were observed to permit multi-spatial mode operation at higher powers, as expected.

In summary, a diffractive mode-selecting mirror was designed to produce a square flat-top mode with very high modal discrimination. Alternate shapes (circular, multiple apertures, etc.) and profiles (tapered, phase-coded, etc.) can be produced as well. The design was demonstrated using a flash-lamp-pumped Nd:YAG laser. The experimentally measured mode shape is very close to the theoretically predicted shape [Leger:94]. The fundamental mode loss from this element was predicted to be 0.001 and experimentally measured to be 0.01 to 0.02. This very low loss makes the technique suitable for both low- and high-gain laser systems.

An aspect of the invention provides the introduction of a low-spatial-frequency phase grating inside a laser resonator employing a diffractive mode-selecting mirror substantially increases spatial mode discrimination while presenting negligible loss to the fundamental mode. This configuration has been used to design a very short highly selective solid-state laser cavity.

It is to be understood that the above description is intended to be illustrative, and not restrictive. Many other embodiments will be apparent to those of skill in the art upon reviewing the above description. For instance, a point z specified within the laser cavity is described above, but a person skilled in the art could use an analogous method starting with point z outside the cavity. The scope of the invention should, therefore, be determined with reference to the appended claims, along with the full scope of equivalents to which such claims are entitled.

REFERENCES

[Bélanger: 91] P. A. Bélanger and C. Paré, Opt. Lett. {16}, 1057 (1991).

[Bélanger: 92] P. A. Bélanger, R. L. Lachance, and C. Paré, "Super-Gaussian output from a $CO_2$ laser by using a graded-phase mirror resonator," Opt. Lett. {17}, 739 (1992).

[Bélanger: 92a] C. Paré and Pierre-André Bélanger, "Custom laser resonators using graded-phase mirrors," IEEE J. Quantum Electron. {QE-28}, 355 (1992).

[Auyeung: 79] J. Auyeung, D. Fekete, A. Yariv, and D. M. Pepper, IEEE J Quantum Electron. {QE-15}, 1180 (1979).

[Fox: 61] A. G. Fox and T. Li, Bell Syst. Tech. J.{40} 453–488 (1961).

[Kermene:92] V. Kermene, A. Saviot, M Vampouille, B. Colombeau, C. Froehly, and T. Dohnalik, "Flattening of the spatial laser beam profile with low losses and minimal beam divergence," Opt. Lett. {17}, 859 (1992).

[Leger: 88] J. R. Leger, M. L. Scott, P. Bundman, and M. P. Griswold, "Astigmatic wavefront correction of a gain-guided laser diode array using anamorphic diffractive microlenses," Proc. SPIE {vol. 884}, 82 (1988).

[Leger: 90] J. R. Leger, "Miniature external cavities for coherent-beam combining," Tech Digest, Opt. Soc. of Am. Annual Meeting, Boston, Mass., 14 (1990).

[Leger: 91] J. R. Leger and G. J. Swanson, "Optical device for laser coupling and coherent beam combining," U.S. Pat. No. 5,033,060 (1991).

[Leger: 92] J. R. Leger and X. Li, "Modal properties of an external diode-laser-array cavity with phase conjugate optics," Bulletin of the American Physical Society {37}, 1212 (1992).

[Leger: 93] J. R. Leger and G. Mowry, Appl. Phys. Lett. {63}, 2884–2886 (1993).

[Leger: 94] J. R. Leger, D. Chen, and Z. Wang, Opt. Lett.{19}, 108–110 (1994).

[Silvestri: 90] S. De Silvestri, V. Magni, O. Svelto, and G. Valentini, IEEE J. Quantum Electron. {QE-26}, 1500 (1990).

What is claimed is:

1. A mode-discriminating laser resonator having a laser beam that has an optical path, the laser beam having a specified mode profile at a location along the optical path, the laser resonator comprising:

a laser gain medium within the laser resonator;

a laser feedback element optically coupled to the laser gain medium; and a first mode-discriminating diffractive element, optically coupled to the laser gain medium and to the laser feedback element, and positioned within the laser resonator such that an optical wavefront in the optical path is incident to the first mode-discriminating diffractive element, the first mode-discriminating diffractive element including a phase-conjugating pattern that reconstructs the specified mode profile, in order to transfer energy more efficiently from the gain medium to the laser beam.

2. The laser resonator according to claim 1, wherein the laser feedback element is optically merged with the first mode-discriminating diffractive element.

3. The laser resonator according to claim 1, further comprising:

a second mode-discriminating element, the second mode-discriminating element having a space-varying phase function that interacts with the effect of phase-conjugating pattern of the first mode-discriminating diffractive element on the laser beam to increase gain discrimination between the specified mode profile and other mode profiles within the laser resonator.

4. The laser resonator according to claim 3, wherein the space-varying phase function includes a randomizing phase-changing pattern.

5. The laser resonator according to claim 3, wherein the space-varying phase function includes a sinusoidal phase-changing pattern.

6. The laser resonator according to claim 3, wherein the second mode-discriminating element includes a liquid crystal layer.

7. The laser resonator according to claim 3, wherein the second mode-discriminating element includes a phase function that forms a complex-phase conjugate of a wave front incident to the second mode-discriminating element.

8. The laser resonator according to claim 7, wherein the first mode-discriminating element and the second mode-discriminating element each comprise a phase-conjugating diffractive mirror.

9. A mode-discriminating diffractive element for a mode-discriminating laser resonator, the resonator having a laser beam that has an optical path, the laser beam having a specified mode profile at a location along the optical path at a distance from the diffractive element, the laser resonator having a laser gain medium within the laser resonator and a laser feedback element optically coupled to the laser gain medium; the diffractive element comprising:

a phase-conjugating pattern, positioned on the diffractive element such that when the diffractive element is placed in the laser resonator, an optical wavefront in the optical path is incident to the phase-conjugating pattern, wherein the phase conjugating pattern operates to reconstruct the specified mode profile, whereby energy is more efficiently transferred from the gain medium to the laser beam.

10. The mode-discriminating diffractive element according to claim 9, wherein the mode-discriminating diffractive element comprises a laser feedback element.

11. The mode-discriminating diffractive element according to claim 10, wherein the mode-discriminating diffractive element comprises a mirror surface.

12. A mode-discriminating laser resonator having a laser beam that has an optical path, the laser beam having a specified non-circularly symmetric mode profile at a location along the optical path, the laser resonator comprising:

a laser gain medium within the laser resonator;

a laser feedback element optically coupled to the laser gain medium; and a first mode-discriminating non-circularly symmetric element positioned within the laser resonator such that an optical wavefront in the optical path is incident to the first mode-discriminating non-circularly symmetric element, the first mode-discriminating non-circularly symmetric element including a phase-conjugating pattern that reconstructs the specified mode profile, in order to transfer energy more efficiently from the gain medium to the laser beam.

13. The laser resonator according to claim 12, wherein the laser feedback element is optically merged with the first mode-discriminating non-circularly symmetric element.

14. The laser resonator according to claim 13, further comprising:

a second mode-discriminating element, the second mode-discriminating element having a space-varying phase function that interacts with the effect of phase-conjugating pattern of the first mode-discriminating non-circularly symmetric element on the laser beam to increase gain discrimination between the specified mode profile and other mode profiles within the laser resonator.

15. The laser resonator according to claim 14, wherein the space-varying phase function includes a randomizing phase-changing pattern.

16. The laser resonator according to claim 14, wherein the space-varying phase function includes a sinusoidal phase-changing pattern.

17. The laser resonator according to claim 14, wherein the second mode-discriminating element includes a liquid crystal layer.

18. The laser resonator according to claim 14, wherein the second mode-discriminating element includes a phase function that forms a complex-phase conjugate of a wave front incident to the second mode-discriminating element.

19. The laser resonator according to claim 18, wherein the first mode-discriminating non-circularly symmetric element and the second mode-discriminating element each comprise a phase-conjugating non-circularly symmetric mirror.

20. A mode-discriminating non-circularly symmetric element for a mode-discriminating laser resonator, the resonator having a laser beam that has an optical path, the laser beam having a specified mode profile at a location along the optical path at a distance from the non-circularly symmetric element, the laser resonator having a laser gain medium within the laser resonator and a laser feedback element optically coupled to the laser gain medium; the non-circularly symmetric element comprising:

a phase-conjugating pattern, positioned on the non-circularly symmetric element such that when the non-circularly symmetric element is placed in the laser resonator, an optical wavefront in the optical path is incident to the phase-conjugating pattern, wherein the phase conjugating pattern operates to reconstruct the specified mode profile, whereby energy is more efficiently transferred from the gain medium to the laser beam.

21. The mode-discriminating non-circularly symmetric element according to claim 20, wherein the mode-discriminating non-circularly symmetric element comprises a laser feedback element.

22. The mode-discriminating non-circularly symmetric element according to claim 21, wherein the mode-discriminating non-circularly symmetric element comprises a mirror surface.

23. A method for increasing discrimination between a specified mode profile and other mode profiles of a laser beam within a laser resonator, the specified mode profile being located along an optical path of the laser beam, the method comprising the steps of:

amplifying to the laser beam within the laser resonator;

providing feedback to the laser beam within the laser resonator; and diffractively forming a phase conjugate of the laser beam that reconstructs the specified mode profile, whereby energy is more efficiently transferred to the laser beam.

24. The method according to claim 23, wherein the step of diffractively forming a phase conjugate includes the step of reflecting.

25. The method according to claim 23, further comprising the step of:

forming a space-varying phase change, the step of forming the space-varying phase change interacting with the step of diffractively forming a phase conjugate to increase gain discrimination between the specified mode profile and other mode profiles within the laser resonator.

26. The method according to claim 25, wherein the step of forming the space-varying phase change includes the step of randomizing phase.

27. The method according to claim 25, wherein the step of forming the space-varying phase change includes the step of generating sinusoidally changing phase.

28. The method according to claim 25, wherein the step of forming the space-varying phase change includes the step of using a liquid crystal layer.

29. The method according to claim 25, wherein the step of forming the space-varying phase change includes the step of forming a complex-phase conjugate of a wave front.

30. The method according to claim 29, wherein the step of forming the space-varying phase change and the step of diffractively forming a phase conjugate each include the step of reflecting.

31. A method for increasing discrimination between a specified non-circularly symmetric mode profile and other mode profiles of a laser beam within a laser resonator, the specified mode profile being located along an optical path of the laser beam, the method comprising the steps of:

amplifying to the laser beam within the laser resonator;

providing feedback to the laser beam within the laser resonator; and forming a phase conjugate of the laser beam that reconstructs the specified non-circularly symmetric mode profile, whereby energy is more efficiently transferred to the laser beam.

32. The method according to claim 31, wherein the step of forming a phase conjugate includes the step of reflecting.

33. The method according to claim 31, further comprising the step of:

forming a space-varying phase change, the step of forming the space-varying phase change interacting with the step of forming a phase conjugate to increase gain discrimination between the specified mode profile and other mode profiles within the laser resonator.

34. The method according to claim 33, wherein the step of forming the space-varying phase change includes the step of randomizing phase.

35. The method according to claim 33, wherein the step of forming the space-varying phase change includes the step of generating sinusoidally changing phase.

36. The method according to claim 33, wherein the step of forming the space-varying phase change includes the step of using a liquid crystal material.

37. The method according to claim 33, wherein the step of forming the space-varying phase change includes the step of forming a complex-phase conjugate of a wave front.

38. The method according to claim 37, wherein the step of forming the space-varying phase change and the step of forming a phase conjugate each include the step of reflecting.

39. A mode-discriminating laser resonator system having a laser beam that has an optical path, the laser beam having a specified mode profile at a location along the optical path, the laser resonator comprising:

a laser gain medium within the laser resonator; and a laser feedback element optically coupled to the laser gain medium, the feedback element having a mode-discriminating diffractive phase-conjugating pattern that reconstructs the specified mode profile in order to transfer energy more efficiently from the gain medium to the laser beam, the pattern positioned within the laser resonator such that an optical wavefront in the optical path is incident to the pattern.

40. A mode-discriminating laser resonator system having a laser beam that has an optical path, the laser beam having a specified non-circularly symmetric mode profile at a location along the optical path, the laser resonator comprising:

a laser gain medium within the laser resonator; and a laser feedback element optically coupled to the laser gain medium, the feedback element having a mode-discriminating non-circularly symmetric phase-conjugating pattern that reconstructs the specified mode profile in order to transfer energy more efficiently from the gain medium to the laser beam, the pattern positioned within the laser resonator such that an optical wavefront in the optical path is incident to the pattern.

* * * * *